UNITED STATES PATENT OFFICE.

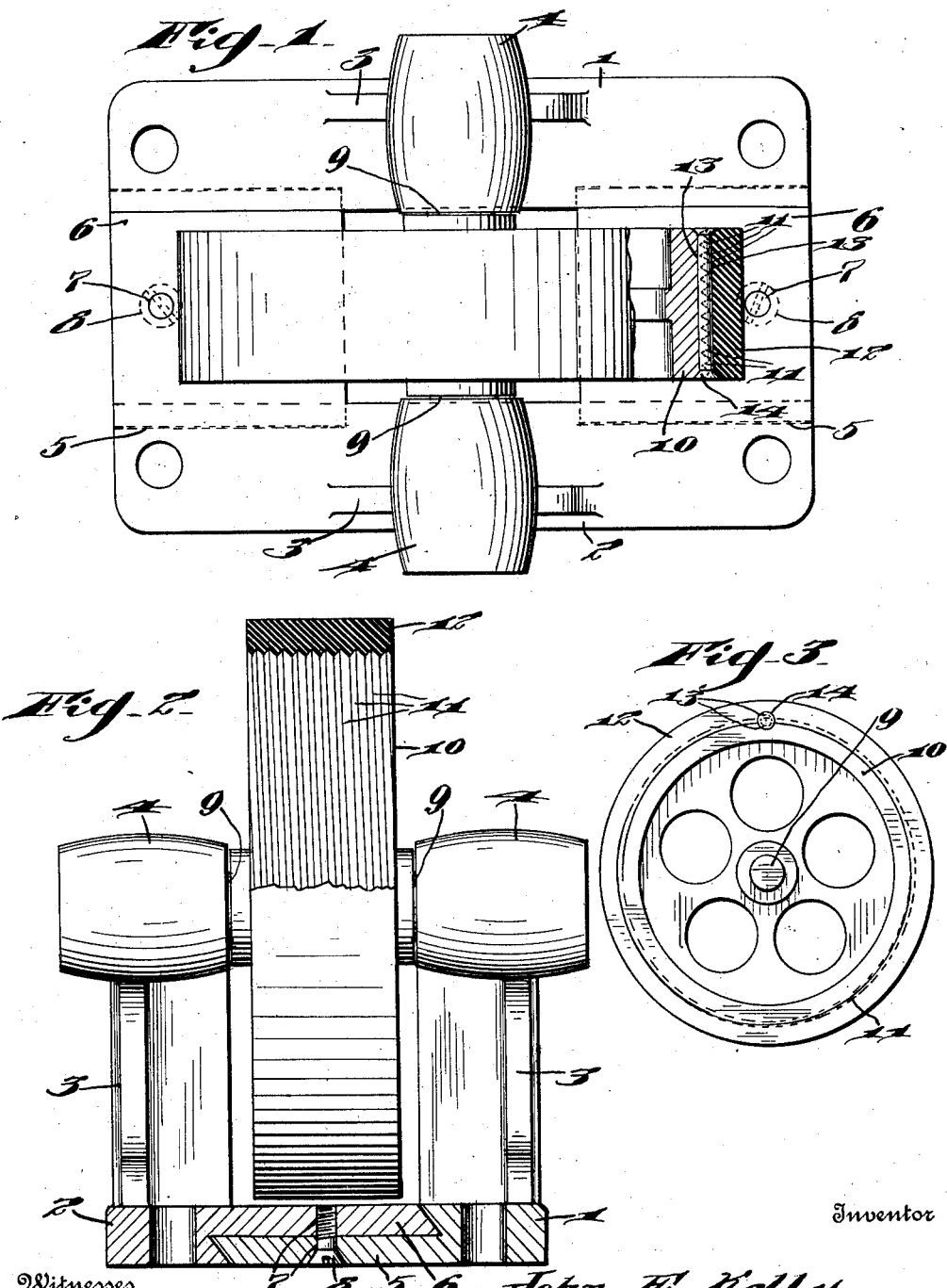

JOHN E. KELLY, OF PHILADELPHIA, PENNSYLVANIA.

SECTIONAL INTERLOCKING BRACKET.

1,016,694. Specification of Letters Patent. Patented Feb. 6, 1912.

Application filed September 20, 1910, Serial No. 582,815. Renewed December 26, 1911. Serial No. 667,961.

*To all whom it may concern:*

Be it known that I, JOHN E. KELLY, a citizen of the United States, residing at Philadelphia, in the county of Philadelphia and State of Pennsylvania, have invented certain new and useful Improvements in Sectional Interlocking Brackets, of which the following is a specification.

My invention relates to improvements in sectional interlocking brackets, an object of the invention being to provide a pulley supporting bracket of this type which will enable a pulley having an integral or fixed journal therein to be readily placed in position in the bearings of the bracket, and the members of the bracket securely interlocked forming a rigid structure.

With this and other objects in view, the invention consists in certain novel features of construction and combinations and arrangements of parts, as will be more fully hereinafter described and pointed out in the claims.

In the accompanying drawings: Figure 1, is a plan view partly in section illustrating my improvements. Fig. 2, is a view in end elevation partly in section, and Fig. 3, is a view on a reduced scale in side elevation of the pulley.

1, and 2, represent the two members of the bracket, both of said members having integral uprights 3 thereon, and integral bearings 4 at the upper ends of the uprights to receive the journal or trunnions 9 of the pulley 10.

The base portions of members 1, and 2, are provided at each end with overlapping interlocking sections 5 and 6 respectively, the latter overlying the former, and both beveled or inclined at their ends snugly fitting similarly shaped recesses in the opposite members. These sections 5, and 6, are provided with registering openings 7, the opening in upper sections 6 being screw-threaded to receive screws 8, which are countersunk in the lower sections 5 and serve to securely clamp the sections together forming the two members of the bracket into a rigid structure, yet capable of disconnection when desired.

The pulley 10 is provided on its rim portion with screw-threads 11, and a tire 12 of rubber or any suitable material is screwed into position on the rim of the pulley, and said rim and tire are preferably provided with registering recesses 13 to receive a rivet 14 upset at its ends to prevent any rotary movement of the tire on the rim, so that after the rim is once screwed in place, it is securely held and cannot move either laterally or longitudinally.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a bracket of the character described, the combination of two members, standards on the members, bearings on the standards, the base portions of the members having flat and bevel ended sections disposed one above the other, and devices securing said sections together, substantially as described.

2. In a bracket of the character described, the combination of two members, standards on the members, bearings on the standards, the base portions of the members having flat and bevel ended sections disposed one above the other, said sections having registering openings, the openings in one member being screw-threaded, and screws in said registering openings clamping the sections together, substantially as described.

3. In a bracket of the character described, the combination of two members, standards on the members, bearings on the standards, the base portions of the members having flat and bevel ended sections disposed one above the other, the ends of said sections being beveled or inclined to fit into corresponding shaped recesses in the opposite members, and devices securing said sections together, substantially as described.

In testimony whereof I have signed my name to this specification in the presence of two subscribing witnesses.

JOHN E. KELLY.

Witnesses:
C. R. ZIEGLER,
C. E. POTTS.

---

Copies of this patent may be obtained for five cents each, by addressing the "Commissioner of Patents, Washington, D. C."